United States Patent
Weidlich

(10) Patent No.: US 9,233,664 B2
(45) Date of Patent: Jan. 12, 2016

(54) WIPER BLADE FOR A WINDSCREEN WIPER

(75) Inventor: Jochen Weidlich, Rastatt (DE)

(73) Assignee: Robert Bosch GmbH, Stuttgart (DE)

(*) Notice: Subject to any disclaimer, the term of this patent is extended or adjusted under 35 U.S.C. 154(b) by 438 days.

(21) Appl. No.: 13/642,667

(22) PCT Filed: Feb. 25, 2011

(86) PCT No.: PCT/EP2011/052780
§ 371 (c)(1),
(2), (4) Date: Dec. 31, 2012

(87) PCT Pub. No.: WO2011/131395
PCT Pub. Date: Oct. 27, 2011

(65) Prior Publication Data
US 2013/0091650 A1    Apr. 18, 2013

(30) Foreign Application Priority Data
Apr. 22, 2010 (DE) .................. 10 2010 028 102

(51) Int. Cl.
*B60S 1/38* (2006.01)
*B60S 1/40* (2006.01)

(52) U.S. Cl.
CPC .. *B60S 1/38* (2013.01); *B60S 1/386* (2013.01); *B60S 1/3855* (2013.01); *B60S 1/3874* (2013.01); *B60S 1/40* (2013.01); *B60S 2001/382* (2013.01)

(58) Field of Classification Search
CPC ........ B60S 1/38; B60S 1/3849; B60S 1/3855; B60S 1/3851; B60S 1/3874; B60S 1/3875; B60S 1/3877; B60S 1/3879; B60S 1/40
See application file for complete search history.

(56) References Cited

U.S. PATENT DOCUMENTS

| 7,523,522 | B2 | 4/2009 | Herring et al. | |
| 7,690,073 | B2 | 4/2010 | Marmoy et al. | |
| 2001/0004783 | A1 | 6/2001 | Kotlarski | |
| 2008/0078051 | A1* | 4/2008 | Herring et al. | 15/250.001 |
| 2010/0275403 | A1 | 11/2010 | Jollec | |
| 2012/0311809 | A1* | 12/2012 | Camps et al. | 15/250.32 |

FOREIGN PATENT DOCUMENTS

| CN | 101088813 | | 12/2007 |
| DE | 10025706 | | 11/2001 |
| DE | 102009002411 | | 10/2010 |
| FR | 2944501 | * | 4/2010 |
| WO | 2008/036894 | | 3/2008 |
| WO | WO2008/113616 A1 | * | 9/2008 |
| WO | 2010086064 | | 8/2010 |

OTHER PUBLICATIONS

Deng Yingying, "Ultrasonic plastic welding mechanism and the fusion bonding behavior of plastic in melt region," CNKI, Engineering Technology, Dec. 15, 2004, (pp. 44-46, including English abstract).

* cited by examiner

Primary Examiner — Gary Graham
(74) Attorney, Agent, or Firm — Michael Best & Friedrich LLP

(57) ABSTRACT

The invention relates to a wiper blade for a windscreen wiper, comprising a wiper strip on which at least one support rail (312, 314) is disposed, wherein said support rail has a spring element (412, 415) provided with a plastic sheath (313, 315), and further comprising a base connection device (160), which includes plastic and is welded to plastic sheath (313, 315), wherein a flat weld seam (419, 421) is formed between the base connection device (160) and the at least one support rail (312, 314).

14 Claims, 4 Drawing Sheets

WIPER BLADE FOR A WINDSCREEN WIPER

BACKGROUND OF THE INVENTION

The present invention relates to a wiper blade for a windscreen wiper, having a wiper strip, on which at least one loadbearing rail is arranged which has a spring element which is provided with a plastic covering, and having a base connection device which has plastic and is welded to the plastic covering.

U.S. Pat. No. 7,523,522 B2 describes a wiper blade of this type having a base connection device which has a plate-shaped carrier part with holding claws which are formed integrally thereon. The holding claws engage round associated loadbearing rails of the wiper blade at least in sections. Four cylindrical depressions are formed in the plate-shaped carrier part, into which cylindrical depressions cylindrical welding tools, what are known as rod-shaped sonotrodes, can be introduced in order to weld the base connection device to the loadbearing rails by means of ultrasonic welding. Said rod-shaped sonotrodes make punctiform welding of the loadbearing rails to the holding claws and the underside of the plate-shaped carrier part in the region of the cylindrical depressions possible.

A disadvantage of said prior art is that the welding takes place only at four predefined welded points and is therefore problematic in the event of the occurrence of shear forces in a direction along the loadbearing rails. Moreover, the punctiform shape of a weld of this type prevents optimum transmission of the forces of a corresponding wiper arm to a wiper strip which is assigned to the wiper blade and therefore to the wiper lip of said wiper strip. In particular, this shape of the weld has a negative influence on the bearing force distribution of the wiper lip on an associated pane, which bearing force distribution is decisive for a desired wiping result.

SUMMARY OF THE INVENTION

It is therefore an object of the invention to provide a novel wiper blade for a windscreen wiper, in which wiper blade an improved bearing force distribution for a wiper lip which is assigned to the wiper blade on a pane can be achieved.

This problem is solved by a wiper blade for a windscreen wiper, having a wiper strip, on which at least one loadbearing rail is arranged which has a spring element which is provided with a plastic covering, and having a base connection device which has plastic and is welded to the plastic covering. A flat welded seam is formed between the base connection device and the at least one loadbearing rail.

The invention therefore makes it possible to provide a wiper blade which makes an improved force transmission from an associated wiper arm to the wiper strip or a wiper lip which is assigned to the wiper blade possible, with a comparatively low spread of pull-off forces.

According to one embodiment, the flat welded seam extends in a substantially tape-like manner over a longitudinal extent which is assigned to the base connection device.

Stable welding of the base connection device to the loadbearing rail can therefore be achieved, in order to obtain an improved bearing force distribution.

The at least one loadbearing rail is preferably formed in a tape-like manner with broad sides and narrow sides. The flat welded seam is preferably formed on one of the broad sides.

Comparatively large-area welding of the base connection device to the loadbearing rail can therefore be achieved.

According to one embodiment, the base connection device has a basic body, on which lateral holding members are provided which engage in a claw-like manner at least in sections around the at least one loadbearing rail.

The invention therefore makes it possible to provide a simple and stable base connection device.

The flat welded seam is formed between a broad side, facing away from the basic body, of the at least one loadbearing rail and a connecting section, facing the loadbearing rail, of the lateral holding member.

Secure and reliable fastening of the base connection device to the loadbearing rail can therefore be achieved.

According to one embodiment, the basic body has at least one through-passage opening which is formed for making it possible to guide a welding tool through the basic body as far as the at least one loadbearing rail during welding of the base connection device to the plastic covering of the at least one loadbearing-rail.

The invention therefore makes precise energy transfer possible in the region of the through-passage opening for melt generation, and therefore makes defined and controlled melt generation possible in this region.

The at least one loadbearing rail is preferably welded to the base connection device by ultrasonic welding.

The loadbearing rail can therefore be welded to the base connection device comparatively quickly and reliably.

An adapter unit which has plastic is preferably welded to the base connection device in order to articulate the wiper strip on a wiper arm. The adapter unit is preferably configured for connection to a connection member which is assigned to the wiper arm.

The wiper strip can therefore be connected to the wiper arm in a simple way.

The adapter unit preferably has at least one projection which engages into the at least one through-passage opening.

A stable connection can therefore be achieved between the adapter unit and the base connection device, the loadbearing rail being held down in a simple way during operation of the wiper blade.

The problem which is mentioned at the outset is also solved by a base connection device for a wiper blade, which base connection device has plastic and can be welded to a plastic covering of a loadbearing rail of the wiper blade. The base connection device has a basic body, on which lateral holding members are provided which in each case have at least one energy direction transmitter and are configured for engaging in a claw-like manner at least in sections around the loadbearing rail in such a way that the energy direction transmitters face a broad side of the loadbearing rail. The basic body has at least one through-passage opening which is formed for making it possible to guide a welding tool through the basic body as far as the loadbearing rail during welding of the base connection device to the plastic covering of the loadbearing rail in order to produce a flat welded seam by melting the energy direction transmitters.

BRIEF DESCRIPTION OF THE DRAWINGS

The invention is explained in greater detail in the following description using exemplary embodiments which are shown in the drawings, in which.

DETAILED DESCRIPTION

Figure 1:
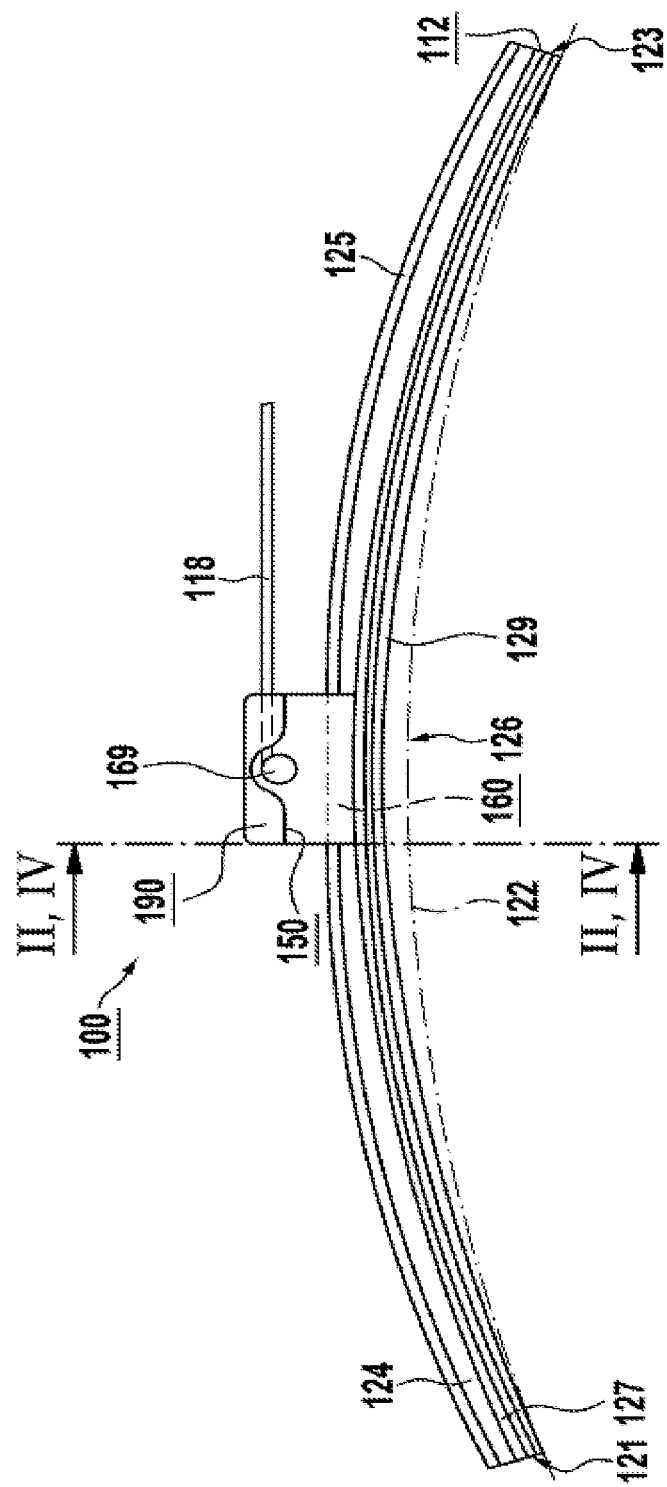
FIG. 1 shows a side view of a wiper blade having a wiper strip, to which a base connection device is fastened by means of ultrasonic welding, according to one embodiment.

FIG. 1 shows a wiper blade 100 having a wiper strip 112 which has a wiper lip 129 which is connected to a rear strip 124 via a tilting web 127. A spoiler 125 is provided on the rear strip 124. A base connection device 160 is provided on the wiper strip 112, to which base connection device 160 an adapter unit 150 is fastened in order to connect a connection member 190 which is assigned to a wiper arm 118. In FIG. 1, the connection member 190 which is also called a holding spring is connected by way of example via a joint pin 169 to the adapter unit 150 which is also called a functional adapter. With the aid of the wiper arm 118, the wiper blade 100 can be guided for wiping purposes over a pane 122, for example a motor vehicle pane, which is shown in a dash-dotted manner.

It is noted, however, that the design of the wiper blade 100 with base connection device 160 and adapter unit 150 for connection of the connection member 190 is of merely exemplary character and is not to be understood as a restriction of the invention. Rather, alternative designs are also possible which likewise fall under the scope of the present invention; for example, the base connection device 160 and the adapter unit 150 can be configured in one piece or the adapter unit 150 and the connection member 190 can be configured in one piece. Moreover, the spoiler 125 is also optional, with the result that the present invention can also be used in wiper blades without a spoiler.

According to one embodiment, the wiper blade 100 is configured in the flat bar design, that is to say the wiper strip 112 has lateral longitudinal grooves, in which two loadbearing rails (312, 314 in FIG. 3), preferably spring bars, are arranged, as will be described below by way of example with respect to FIG. 3. Here, the loadbearing rails (312, 314 in FIG. 3) can be connected to one another at their axial ends, for example via suitable end caps. As an alternative to this, the wiper strip 112 can be configured as a hollow profile with an approximately central longitudinal channel, in which a single loadbearing rail is arranged. Wiper blades of this type and their designs are sufficiently well known to a person skilled in the art, with the result that a detailed description is omitted here for the purpose of conciseness of the description.

The wiper strip 112 with the base connection device 160 provided on it is preferably of joint-free configuration, the base connection device 160 preferably being premounted on the wiper strip 112. According to one embodiment, the base connection device 160 is welded to the loadbearing rails (312, 314 in FIG. 3) by way of a suitable welding operation, for example an ultrasonic welding operation, and the adapter unit 150 is welded to the base connection device 160, as will be described below with respect to FIGS. 3 and 4. To this end, the base connection device 160 and the adapter unit 150 have plastic and can be configured as plastic parts, for example by means of plastic injection molding.

In FIG. 1, the wiper blade 100 has not yet been placed completely onto the pane 122; only its axial wiper blade ends 121, 123 bear against the pane 122, whereas the wiper strip 112 is still spaced apart from the pane 122 in the wiper blade center 126, that is to say approximately in the region of the adapter unit 150. If a provided pressing force is exerted on the connection member 190 and therefore the adapter unit 150 via the wiper arm 118, the wiper strip 112 comes to bear against the pane 122, a uniform contact pressure being achieved over the entire wiper blade length, even if the pane curvature changes during the course of the wiping movement. Here, a bearing force distribution of the wiper strip 112 and of the wiper lip 129 on the pane 122 is achieved, which bearing force distribution is dependent on a shape which is introduced into an associated welded seam (419, 421 in FIG. 4) during the welding of the base connection device 160 to the loadbearing rails (312, 314 in FIG. 3), as will be described below with respect to FIG. 4.

Figure 2:
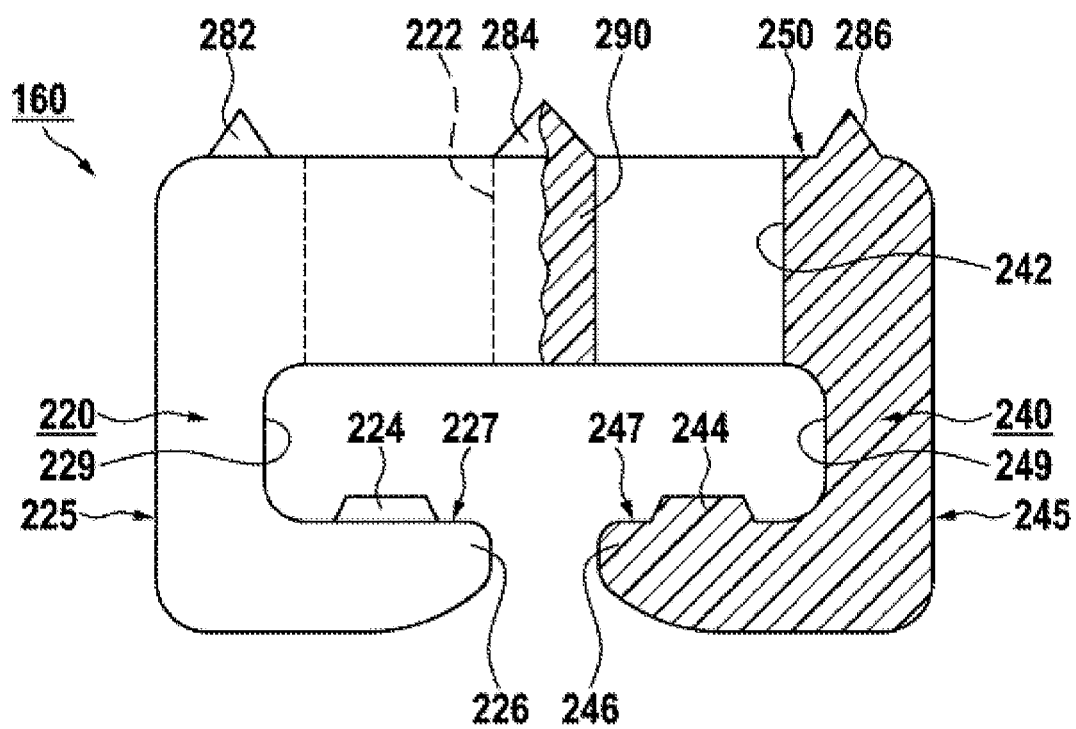
FIG. 2 shows a partially sectioned front view of the base connection device of FIG. 1, in the direction of the arrow II of FIG. 1.

FIG. 2 shows a partially sectioned front view of the base connection device 160 of FIG. 1 according to one embodiment. It has, by way of example, a basic body 290, on which lateral holding members 220, 240 are provided, for example are integrally molded.

By way of example, two elongate through-passage openings 222, 242 are formed in the basic body 290. By way of illustration, three optional, elongate energy direction transmitters 282, 284, 286 are provided on an upper side 250 of the basic body 290, which energy direction transmitters 282, 284, 286 are used during welding of the of the base connection device 160 to the adapter unit 150 of FIG. 1, as will be described below with respect to FIG. 4.

By way of illustration, the lateral holding member 220 extends in an L-shaped manner starting from the basic body 290, and forms a groove 229 with the latter. According to one embodiment, the lateral holding member 220 has a lateral wall section 225 and a lower connecting section 226, on the upper side 227 of which, which faces the basic body 290, an elongate energy direction transmitter 224 is provided.

Relative to the holding member 220, the lateral holding member 240 extends in an approximately horizontally mirrored L-shaped manner starting from the basic body 290, and forms a groove 249 with the latter. According to one embodiment, the lateral holding member 240 has a lateral wall section 245 and a lower connecting section 246, on the upper side 247 of which, which faces the basic body 290, an elongate energy direction transmitter 244 is provided.

According to one embodiment, the base connection device 160 is produced by means of plastic injection molding, as has been described above with respect to FIG. 1. Here, the energy direction transmitters 224, 244 can be formed by a core puller which reaches through the through-passage openings 222 and 242 or suitable contours of a corresponding injection molding die with the specification of a desired shape which cannot be produced in this way starting from the lateral wall sections 225, 245 of the holding members 220 and 240, for example in the shape of a pyramid.

Figure 3:
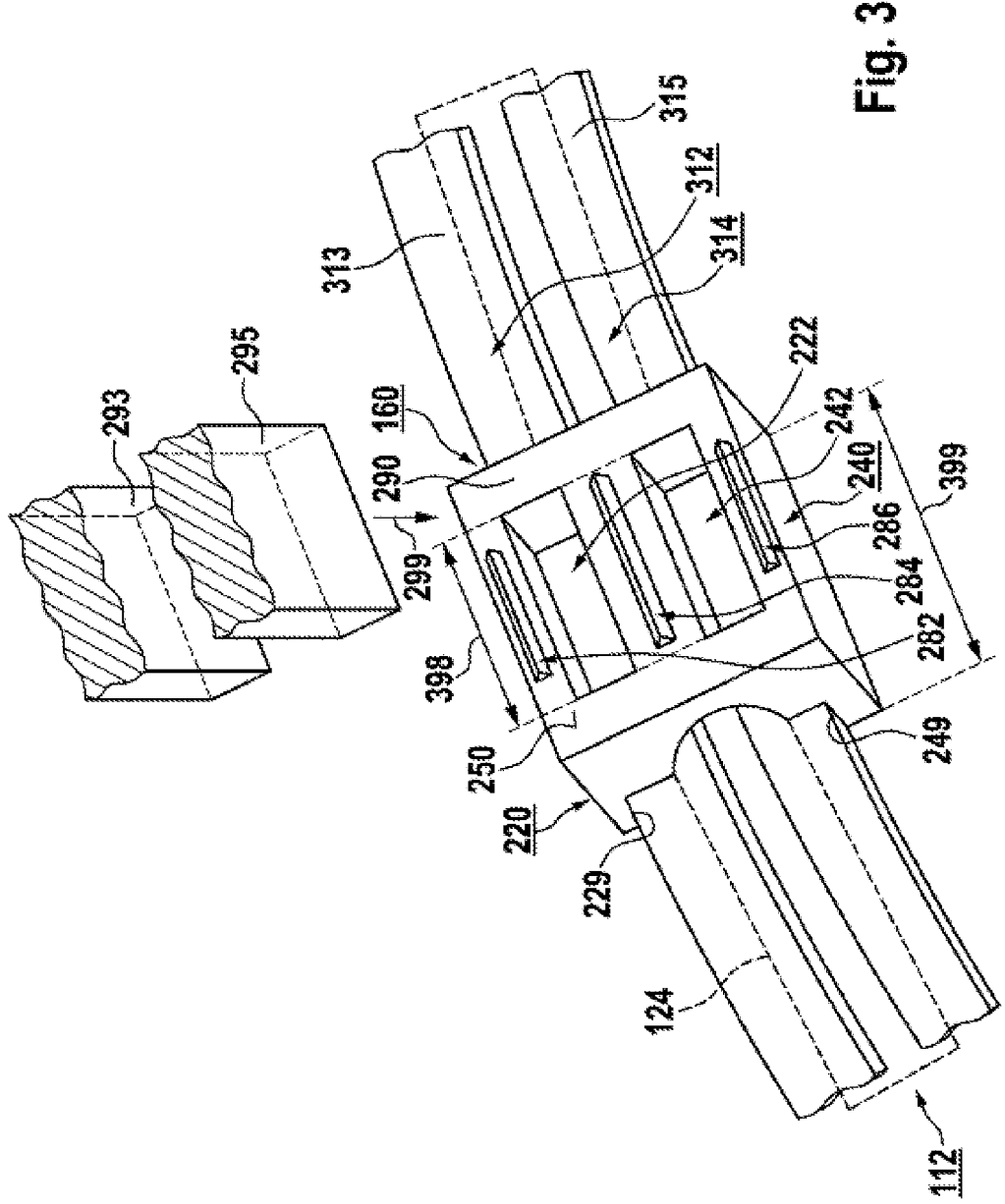
FIG. 3 shows a perspective view of the base connection device of FIG. 2, when welded to associated loadbearing rails.

By way of illustration, FIG. 3 shows the base connection device 160 of FIG. 2, when welded to exemplary loadbearing rails 312, 314 of the wiper blade 100 of FIG. 1, and clarifies the elongate through-passage openings 222, 242 of FIG. 2 which can extend almost completely over a longitudinal extent 399 of the base connection device 160. In the context of the present invention, this means that the through-passage openings 222, 242 can have a length 398 which is preferably as great as possible relative to the longitudinal extent 399, but does not compromise the functionality of the base connection device 160.

According to one embodiment, the base connection device 160 is arranged on the wiper strip 112 in such a way that its holding members 220, 240 engage in a claw-like manner at least in sections around the loadbearing rails 312 and 314 which are provided with plastic coverings 313, 315, with the result that the energy direction transmitters (224 and 244 in FIG. 2) which are provided on the holding members 220, 240 in each case face a broad side (463, 473 in FIG. 4), facing away from the basic body 290, of the loadbearing rail 312 and 314. Here, by way of example, the loadbearing rail 312 is arranged in the groove 229 and the loadbearing rail 314 is arranged in the groove 249 of the base connection device 160.

Moreover, as has been described with respect to FIG. 1, the loadbearing rails 312, 314 are arranged in associated lateral longitudinal grooves of the wiper strip 112 of FIG. 1, which longitudinal grooves are formed, for example, on the rear strip 124 of said wiper strip 112. The rear strip 124 is shown in FIG. 3 only diagrammatically for the purpose of clarity and conciseness, whereas an illustration of the remaining wiper strip components has been dispensed with in order to simply the drawing.

In order to weld the base connection device 160 to the plastic covering 313, 315 of the loadbearing rails 312 and 314, elongate welding tools 293, 295 are introduced, by way of example, into the elongate through-passage openings 222 and 242 in the direction of an arrow 299. Here, the welding tools 293, 295 are preferably guided through the basic body 290 as far as the loadbearing rails 312, 314 in order to produce a flat welded seam (419, 421 in FIG. 4) by melting the energy direction transmitters (224, 244 of FIG. 2).

According to one embodiment, the base connection device 160 is welded to the loadbearing rails 312, 314 or their plastic coverings 313 and 315 by ultrasonic welding. Here, what are known as blade sonotrodes with curved and rounded or straight and flattened base faces are used as welding tools 293, 295.

Figure 4:
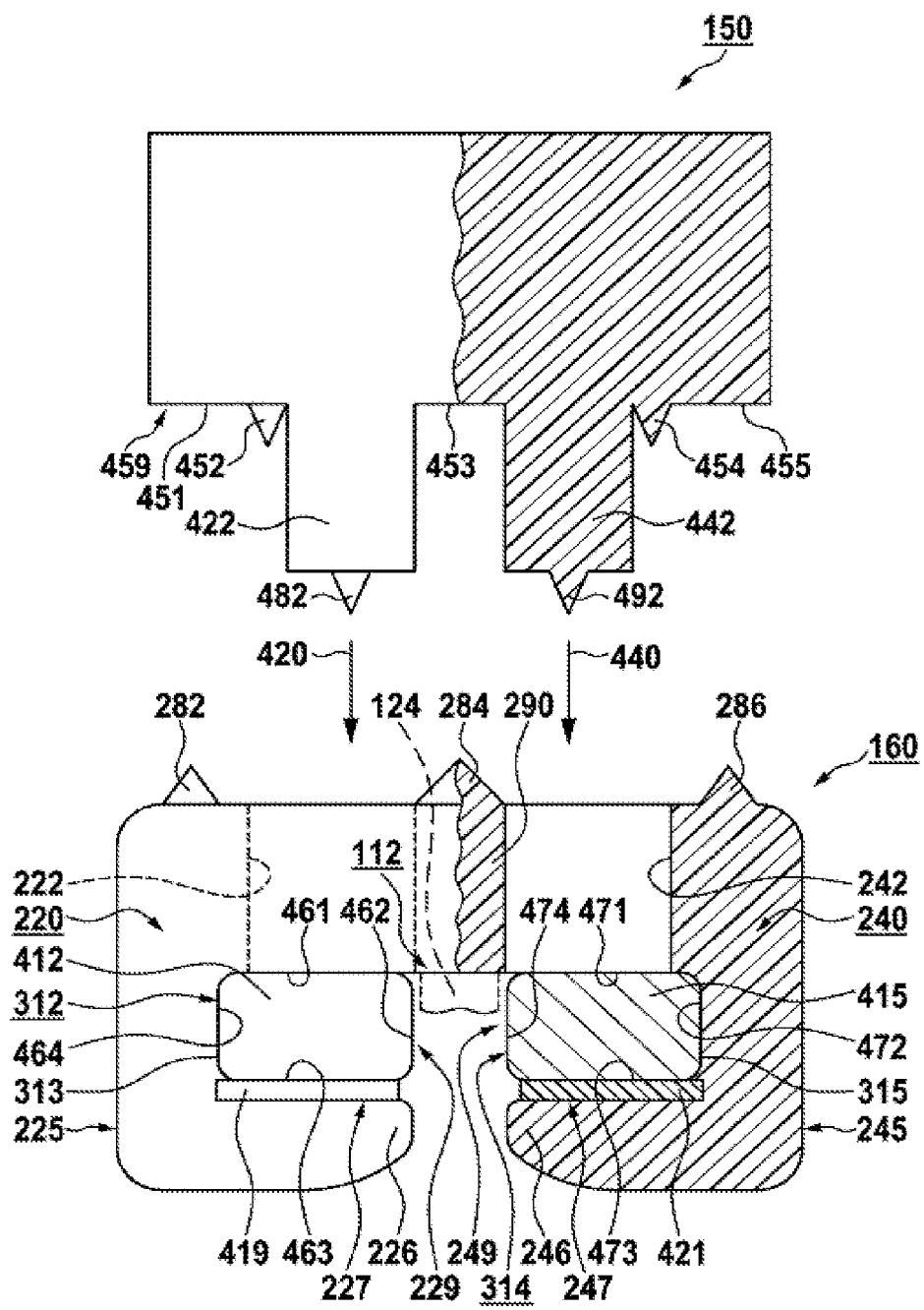
FIG. 4 shows a partially sectioned view of the base connection device of FIG. 3 which is welded to the loadbearing rails, with the adapter unit of FIG. 1, in the direction of the arrow IV of FIG. 1.

FIG. 4 shows a partially sectioned view of the base connection device 160 of FIG. 2 which is welded to the loadbearing rails 312, 314 of FIG. 3 of the wiper strip 112 of FIG. 1. It is noted, however, that, for the purpose of simplification and clarity of the drawing, a complete depiction of the wiper strip 112 has been dispensed with and merely its rear strip 124 is indicated diagrammatically in sections.

According to one embodiment, the loadbearing rails 312, 314 in each case have a spring element 412 and 415 which is provided with the plastic covering 313 and 315. The spring elements 412, 415 are, for example, spring bars which are formed from flat or round wire and are configured, for example, from hardened steel, titanium or aluminum. As an alternative, the spring elements 412, 415 can be configured from plastic.

The loadbearing rail 312 which is arranged in the groove 229 of the base connection device 160 is preferably of tape-like configuration and, by way of illustration, has an upper broad side 461, a lower broad side 463, a left-hand narrow side 464 and a right-hand narrow side 462. In an analogous manner to this, the loadbearing rail 314 which is arranged in the groove 249 and is likewise preferably of tape-like configuration has, by way of illustration, an upper broad side 471, a lower broad side 473, a left-hand narrow side 474 and a right-hand narrow side 472.

According to one embodiment, at least the elongate energy direction transmitter 224 (FIG. 2) which is provided on the connecting section 226 of the lateral holding member 220 of the base connection device 160 is melted off during an ultrasonic welding operation which is carried out as described in FIG. 3, in such a way that the plastic covering 313 of the loadbearing rail 312 and the melted-off energy direction transmitter 224 (FIG. 2) form a flat welded seam 419 which connects the lower broad side 463 of the loadbearing rail 312 to the connecting section 226. The flat welded seam 419 preferably extends at least over the length 398 (FIG. 3) of the through-passage opening 222. In other words, the flat welded seam 419 preferably extends in a substantially tape-like manner over the longitudinal extent 399 (FIG. 3) which is assigned to the base connection device 160.

In an analogous manner to this, the elongate energy direction transmitter 244 (FIG. 2) which is provided on the connecting section 246 of the lateral holding member 240 of the base connection device 160 is preferably melted off in such a way that the plastic covering 315 of the loadbearing rail 314 and the melted-off energy direction transmitter 244 (FIG. 2) form a flat welded seam 421 which connects the lower broad side 473 of the loadbearing rail 314 to the connecting section 246. The flat welded seam 421 preferably extends at least over the length 398 (FIG. 3) of the through-passage opening 242. In other words, the flat welded seam 421 preferably extends in a substantially tape-like manner over the longitudinal extent 399 (FIG. 3) which is assigned to the base connection device 160.

Here, a desired profile of the welded seams 419 and 421 and therefore of the loadbearing rails 312 and 314 in the region of the base connection device 160 can have been formed by a suitable design of the blade sonotrodes 293, 295 of FIG. 3 or of its base faces. The desired profile can be, for example, of rounded and curved or flattened and straight configuration.

According to one embodiment, the adapter unit 150 of FIG. 1 can be welded to the base connection device 160 after welding of the base connection device 160 to the loadbearing rails 312, 314. By way of example, the adapter unit 150 has two projections 422, 442 on its underside 459, which projections 422, 442 are configured for centering the adapter unit 150 on the base connection device 160. Said projections 422, 442 have external dimensions which correspond approximately to the internal dimensions of the through-passage openings 222 and 242. The projections 422, 442 divide the underside 459 in FIG. 4 into three sections 451, 453, 455, on which energy direction transmitters can be formed. By way of illustration, optional energy direction transmitters 452, 454 are formed on the sections 451, 455. Moreover, one or more energy direction transmitters 482, 492 can also be formed on the projections 422, 442.

In order to weld the adapter unit 150 to the base connection device 160, the projections 422, 442 are introduced in the direction of arrows 420, 440 into the through-passage openings 222 and 242 and therefore engage into the latter. The energy direction transmitters 452, 455, 282, 284, 286 are then melted off in a suitable welding operation, for example an ultrasonic welding operation or an alternative plastic joining process, for example laser plastic welding, with the result that the adapter unit 150 and the base connection device 160 are connected to one another in the region of the sections 451, 453, 455. Here, melted plastic can flow by way of capillary action into gaps which occur between the projections 422, 442 and the through-passage openings 222 and 242 and therefore improve the attachment of the adapter unit 150 to the base connection device 160. Moreover, the projections 422, 442 are welded to the plastic coverings 313 and 315 by melting off of the energy direction transmitters 482, 492 with simultaneous melting of the plastic coverings 313, 315 of the loadbearing rails 312 and 314 in the region of the energy direction transmitters 482, 492, with the result that positively locking and substantially complete embedding of the loadbearing rails 312, 314 in the grooves 229 and 249 is achieved.

It is noted that the above-described use of the energy direction transmitters 452, 455, 282, 284, 286 and 224, 244 of FIG. 2 is merely exemplary in character and is not to be understood as a restriction of the invention which can likewise be carried out without the use of energy direction transmitters of this type. For example, a suitable, melting additional material can be used in each case during the welding for melt production. However, the use of the energy direction transmitters is advantageous, in order to achieve improved melt production during the welding.

What is claimed is:

1. A wiper blade (100) for a windscreen wiper, comprising a wiper strip (112), on which at least one loadbearing rail (312, 314) is arranged, the loadbearing rail having a spring element (412, 415) which is provided with a plastic covering (313, 315), a base connection device (160) which has plastic and is welded to the plastic covering (313, 315), and a flat welded seam (419, 421) between the base connection device (160) and the at least one loadbearing rail (312, 314), wherein the base connection device (160) includes a basic body (290) that has at least one through-passage opening (222, 242) configured to guide a welding tool (293, 295) through the basic body (290) at least as far as the at least one loadbearing rail (312, 314), and wherein an adapter unit (150) is welded to the base connection device, the adapter unit (150) having at least one projection (422, 442) which engages into the at least one through-passage opening (222, 242).

2. The wiper blade as claimed in claim 1, characterized in that the flat welded seam (419, 421) extends over a longitudinal extent (399) of the base connection device (160).

3. The wiper blade as claimed in claim 2, characterized in that the at least one loadbearing rail (312, 314) is formed with broad sides (461, 463, 471, 473) and narrow sides (462, 464, 472, 474), the flat welded seam (419, 421) being formed on one of the broad sides (461, 463, 471, 473).

4. The wiper blade as claimed in claim 3, characterized in that the basic body (290) includes lateral holding members (220, 240) which engage as claws at least in sections around the at least one loadbearing rail (312, 314).

5. The wiper blade as claimed in claim 4, characterized in that the flat welded seam (419, 421) is formed between a broad side (463, 473), facing away from the basic body (290), of the at least one loadbearing rail (312, 314) and a connecting section (226, 246), facing the loadbearing rail (312, 314), of the lateral holding member (220, 240).

6. The wiper blade as claimed in claim 5, characterized in that the at least one through-passage opening (222, 242) is configured to guide the welding tool (293, 295) through the basic body (290) as far as the at least one loadbearing rail (312, 314) during welding of the base connection device (160) to the plastic covering (313, 315) of the at least one loadbearing rail (312, 314).

7. The wiper blade as claimed in claim 6, characterized in that the at least one loadbearing rail (312, 314) is welded to the base connection device (160) by ultrasonic welding.

8. The wiper blade as claimed in claim 7, characterized in that the adapter unit (150) has plastic and is welded to the base connection device (160) in order to articulate the wiper strip (112) on a wiper arm (118), the adapter unit (150) being configured for connection to a connection member (190) of the wiper arm (118).

9. The wiper blade as claimed in claim 1, characterized in that the at least one loadbearing rail (312, 314) is formed with broad sides (461, 463, 471, 473) and narrow sides (462, 464, 472, 474), the flat welded seam (419, 421) being formed on one of the broad sides (461, 463, 471, 473).

10. The wiper blade as claimed in claim 1, characterized in that the basic body (290) includes lateral holding members (220, 240) which engage as claws at least in sections around the at least one loadbearing rail (312, 314).

11. The wiper blade as claimed in claim 10, characterized in that the flat welded seam (419, 421) is formed between a broad side (463, 473), facing away from the basic body (290), of the at least one loadbearing rail (312, 314) and a connecting section (226, 246), facing the loadbearing rail (312, 314), of the lateral holding member (220, 240).

12. The wiper blade as claimed in claim 1, characterized in that the at least one through-passage opening (222, 242) is configured to guide the welding tool (293, 295) through the basic body (290) as far as the at least one loadbearing rail (312, 314) during welding of the base connection device (160) to the plastic covering (313, 315) of the at least one loadbearing rail (312, 314).

13. The wiper blade as claimed in claim 1, characterized in that the at least one loadbearing rail (312, 314) is welded to the base connection device (160) by ultrasonic welding.

14. The wiper blade as claimed in claim 1, characterized in that the adapter unit (150) has plastic and is welded to the base connection device (160) in order to articulate the wiper strip (112) on a wiper arm (118), the adapter unit (150) being configured for connection to a connection member (190) of the wiper arm (118).

* * * * *